Figure 3:
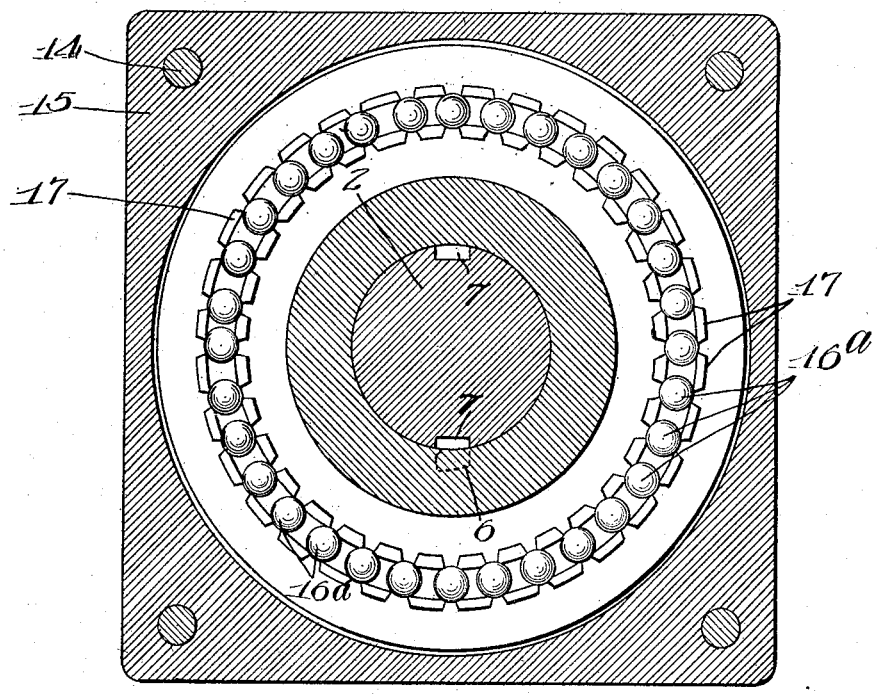

H. PARKER.
ANTIFRICTION BEARING.
APPLICATION FILED APR. 7, 1906.
1,119,034.
Patented Dec. 1, 1914.
2 SHEETS—SHEET 1.
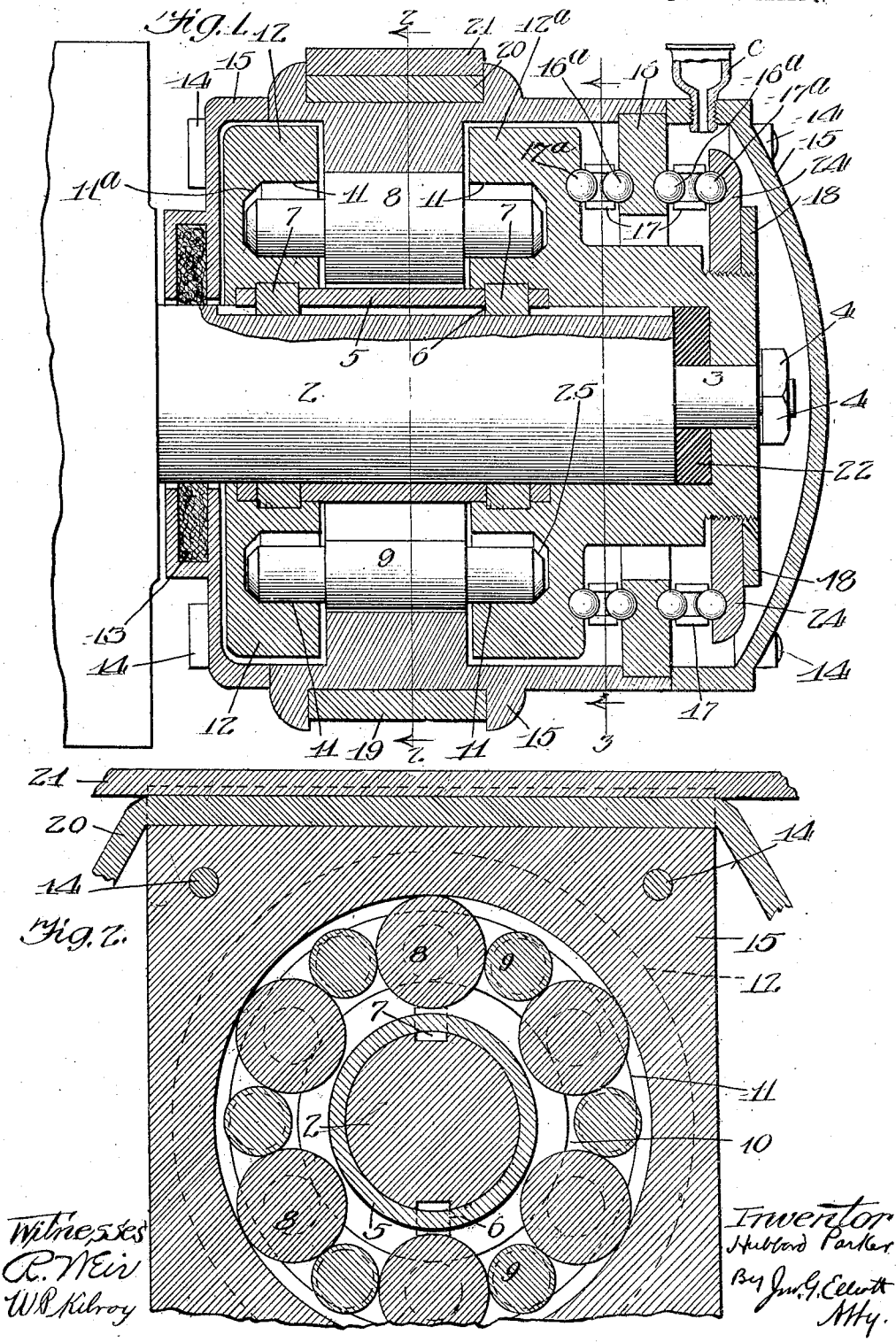

H. PARKER.
ANTIFRICTION BEARING.
APPLICATION FILED APR. 7, 1906.

1,119,034.

Patented Dec. 1, 1914.

2 SHEETS—SHEET 2.

UNITED STATES PATENT OFFICE.

HUBBARD PARKER, OF MOUNT VERNON, ALABAMA.

ANTIFRICTION-BEARING.

1,119,034. Specification of Letters Patent. Patented Dec. 1, 1914.

Application filed April 7, 1906. Serial No. 310,487.

*To all whom it may concern:*

Be it known that I, HUBBARD PARKER, a citizen of the United States, and a resident of Mount Vernon, in the county of Mobile and State of Alabama, have invented certain new and useful Improvements in Anti-friction-Bearings, of which the following is a specification.

This invention relates to improvements in anti-friction bearings for the journals of axles, shafts and, in fact, any device in which balls or rollers may be used to advantage for reducing friction and dispensing with the necessity of a lubricant, and particularly in those structures in which balls and rollers revolve both on their axes and around the shaft axle or other device, and are held apart, that is to say, separated by spreader rollers and other devices.

Prior to my invention, in bearings in which balls or rollers or both, as may be, are employed, there has been a possibility of slipping or grinding contact or both, in cases where the conditions of operation cause an end thrust, and so far as I can discover no provision taking care of such end thrust has been provided in any device without there being present at the same time, slipping, twisting or grinding contact between surfaces of which one, or both, were rotating.

While claims may have been made heretofore to rolling friction in a direction perpendicular to the axis of the axle such devices are deficient at some point of the rotation, or under some of the conditions of their operation, but I know of no invention previous to mine, that provides anti-friction rolling contact between surfaces, one or both of which rotate under any and all conditions of operation.

The prime object of my invention is an anti-friction bearing in which the balls or rollers or both, as may be are so arranged with reference to a journal or axle and to each other, that they will roll upon all surfaces with which they contact and upon each other with an entire absence of any possible slipping or grinding movement at all points of such contacts, and thereby reduce the friction of the anti-friction bearing to a minimum.

A further object of my invention is to provide a bearing which is exclusively rolling with simple and convenient means for endwise adjustment of both the anti-friction rollers and the spreader rollers by means, simple in construction, exclusively rolling, convenient in operation, and adapted to reduce the end thrusts of said rollers to a minimum, and to take up wear both of the rollers and their bearing surfaces.

A further object of my invention is to provide a simple and effective means of sustaining and maintaining anti-friction bearing within a suitable casing or hub adapted to be conveniently secured in its operative position.

Another object is to have an anti-friction journal bearing structure of such form as to exclude dust and other foreign substances therefrom.

A further object is a bearing structure provided with adjustable anti-friction devices, supporting and maintaining in line the free end of an axle, and also from contact with its casing or hub.

With these ends in view, my invention consists in certain features of novelty in construction, combination and arrangement of parts, by which these objects and certain other objects hereinafter set forth are attained, all as fully described with reference to the accompanying drawings, and more particularly pointed out in the claims.

Figure 4:
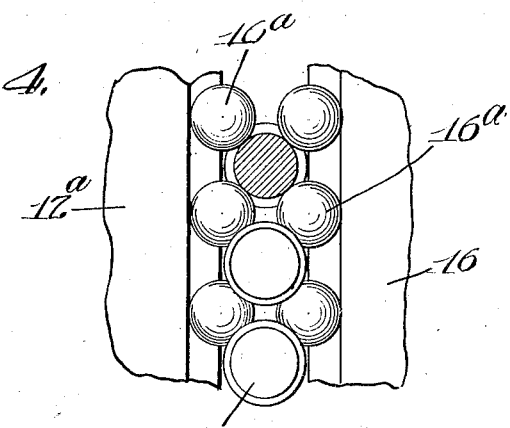

In said drawings: Figure 1 illustrates a central longitudinal section in differing planes through an anti-frictional journal bearing containing my invention, and in which it is shown in its application to the axle of a railroad car. Fig. 2, vertical transverse section on the line 2—2 of Fig. 1. Fig. 3, a transverse section on the line 3—3 of Fig. 1, showing the arrangement of the ball and roller device, suspending the anti-friction journal and journal structure within its casing and Fig. 4, a detail plan view of the same.

Similar characters of reference indicate the same parts in the several figures of the drawings.

2 indicates either a shaft or an axle, but when an axle (see Fig. 1) it is provided with a contracted portion 3, projecting through a disk 12$^a$, and has its outer end screw-threaded to receive the nut 4.

Secured on the axle by means of keys 7 is a sleeve 5, provided with openings 6, for the passage therethrough of said keys 7, the inner ends of which keys seat respectively in key seats in the axle 2, and in oppositely arranged disks 12—12$^a$, which disks, are thereby held rigid as regards each other and against turning upon the axle, but are adjustable longitudinally on the shaft by elongations in the key-seats 6, the inward longitudinal movement of the axle, being limited by the jam-nut 4.

The outward end thrust of the axle is taken up and cushioned by a rubber packing 22, but no cushioning is provided for the nut 4, because of a cushion, (not shown) on the other end of the axle, which receives the blow.

The disks 12—12$^a$, are provided with oppositely arranged annular grooves 11, the inner corners 11$^a$, of which are oblique with reference to the end and side walls thereof, which grooves form bearings for the main anti-friction rollers, having a larger diameter bearing against the casing 15, and a smaller diameter on the inner faces of the grooves 11, the outer ends of the diametrical portion of which are beveled to an incline corresponding to the oblique surfaces in the grooves, against which they have their thrust bearings.

The main anti-friction rollers 8, are maintained separate from each other by what for convenience are termed spreader-rollers 9, having larger diameters bearing against and spreading apart the main rollers 8, and smaller diameters bearing against the outer faces of the grooves 11, the ends of which spreader rollers are beveled to correspond with the oblique bearing surfaces in the grooves, and against which they have their bearing, the lengths of both the rollers 8 and 9, being such that they have no contact with the end walls of the groove in which they are located, and are of such length that they have practically no end-thrust although running perfectly free in their bearings.

From the foregoing it should be understood that the larger diameters of the main rollers 8, contact with the casing, but do not contact with the sleeve 5, that the reduced portions thereof contact with the inner wall, but not with either the outer or end walls of the annular groove in the casing; and that on the other hand the larger diameters of the spreader rollers 9, contact with both the main rollers adjacent thereto and the reduced portions thereof contact with the outer wall of the annular grooves in the disks, but not with either the inner or the end walls thereof or with the casing.

The casing 15, adjacent to disk 12, is preferably provided with an annular groove, surrounding the axle 2, containing suitable packing 13, the sole function of which is to exclude dust and other foreign substances from the casing and other parts of the bearing. The casing may be made up of any number of parts, preferably a cylindrical or angular body portion, as indicated in Fig. 2, a grooved end-piece for packing, and a cap, entirely closing the outer end of the bearing, and the axle with these several parts removably secured together by means of bolts 14, as illustrated in Fig. 2, and it would be no departure to have the casing of any other desirable or suitable form or number of pieces. Nor would it be a departure to have the casing in the form of a hub revolving on a fixed axle as in road vehicles the internal arrangement being identical.

When my invention is adapted for a roller bearing for an axle, and as I have so far described it, some means should be provided for holding the disks away from the adjacent casing and for supporting the outer end of the axle within the casing or hub, especially when, as in car-axles, there is considerable leverage, the casing or box being suspended by a strap 19, and to these ends, I employ a ring 16, seated in the casing surrounding an extended and reduced portion of the disk 12$^a$, which ring is provided on the opposite sides of its depending portion with annular, semi-circular like grooves in cross-section, respectively forming a support and bearing for one set of two series of balls, 16$^a$, the opposite sides of which bear against, and are supported by a spool 17, have their inner bearing and support, the outer bearings of which balls 17$^a$, are in and against annular grooves respectively formed in the disk 12$^a$, and a ring 24, screwed on the outer end of the disk, and locked in its adjusted position by a jam-nut 18.

From the foregoing it will be seen that the spools 17, are entirely supported and suspended by the balls, and serve to spread and maintain the inner and outer balls from contact with each other, while the adjustment of the disk 24, serves to maintain these several anti-friction devices in their proper relative positions, to take up wear of both the balls and their bearings, and to hold the disks free from the walls of the casing.

In assembling the structure shown in Figs. 1 and 2, the sleeve 5 is first slipped into the disk 12 and after inserting the keys 7—7, the disk 12 is placed in the first and adjacent section and the second section coupled to it and all of the rollers placed in their positions. The disk 12$^a$ is then slipped upon the sleeve until the several rollers are in their operative position when the keys 7—7 are then inserted to place. After placing the first series of balls and spools and balls in position on disk 12$^a$, the ring 16 is inserted in the casing, and after the second series of balls and spools and balls are placed in position the disk 24 is adjusted against them but so that disks 12 and 12$^a$ do not come in contact with the casing 15 at any point, and which can be ascertained by noting how far disk 12$^a$ projects beyond the ring 16, and after which the jam-nut 18 is screwed to place against the disk 24. The axle 2 is now slipped in so that its slotted key seat embraces the keys 7—7 and until its smaller projection passes through the disk 12ª and engages the rubber cushion 22 when the nut 4 is screwed to place on the projecting end thereof. All of the sections of the casing are then bolted together by passing therethrough the bolts 14 and tightening them by the usual nuts. After inserting oil soaked waste in 13 the straps 20 and 21 are placed in position on the casing and after bolting them and the bearing on the other end of the axle, the axle is ready for work.

In operation, the simultaneous turning on their common axis of the axle 2, and the disks 12—12ª, produces a rotation of the main rollers 8. on their own axes, in a direction opposite that of the shaft and disks, owing to the contact of the reduced ends of the rollers 8, with the inner walls of the groove in the disks, and of the larger diameters of the rollers 8, with the casing, which is stationary, and as a result of which the rollers 8, during their bodily and translating movement, roll in contact with the casing in the same direction as that of the axial movement of the axle. On the other hand the spreader rollers 9, through the contact of their reduced portions with the outer walls of the annular groove 11, of the disks 12—12ª and the contact of their larger diameters with the surface of adjacent main rollers 8, are thereby caused to rotate on their axes in contrary direction from the main rollers with which they contact as a result of which a rolling contact is continuously maintained not only between the spreader rollers with the disk and the main rollers in their axial rotation, but in their bodily or translating movement about the axle and with the main rollers; in other words, at every point of contact of all of the movable members of the bearing, both between each other and the immovable portions, there is a rolling bearing, and in the same direction as that of their translating movement.

In practice, the diameters of the rollers 8 and 9, are so proportioned that the number of revolutions necessary for the main rollers 8, to complete their translating movement once around the inner face of the grooves in the disk 12, is exactly the same as that necessary for their larger diameter to travel once around the inside face of the casing 15, and the number of revolutions made by the larger diameter of the main rollers 8, on the larger diameter of the spreader rollers, 9, in a contrary direction, is exactly the same as that necessary for the smaller diameter of the spreader rollers 9 to travel around the outer face of the disks 12—12ª, while the main rollers are traveling once around on the inner faces of the disks and the inside of the casing 15. The result of this correspondence in the movements of the rollers, and the distance traveled, is that after making two revolutions the axle, the different rollers, disks and other parts return to their original positions, and do this at every complete second revolution without any skidding or grinding of their surfaces against each other, the disks or casing, and that during such revolutions, they produce rolling friction only.

I find in practice, that when using a 4 inch car-axle journal, the proportionate size of the several parts should be as follows:— The main rollers 8, having a large diameter of one and fifteen sixteenths (1-15/16) inches; small diameter, one and twenty-three one hundred twenty-eighths (1-23/128) inches. Spreader rollers 9; large diameter, one and one fourth (1-1/4) inches; small diameter, one and twenty-five one hundred twenty-eighths (1-25/128) inches. The disks 12—12ª, have a diameter between the inner walls of their grooves of four and one hundred thirteen one hundred twenty-eighths (4-113/128) inches; and a diameter between the outer walls of such grooves of seven and three-fourths (7-3/4) inches. The casing 15, has an inside diameter of eight (8) inches.

When the several parts have the diameters above stated, the smaller diameters of the main rollers traverse the circumference of the inner walls of the grooves in 4.129 revolutions, and at one revolution of the axle, the larger diameters of the main rollers traverse one-half the distance of the inside circumference of the casing.

In all cases, so far as I am informed, there appears somewhere, or somehow, a grinding friction which it is important, if possible, to eliminate, and which can only be eliminated by an arrangement that will prevent any slipping or grinding movement between contacting surfaces, one, or both of which rotate under any and all conditions of operation, and which is provided for by my invention.

The spreader rollers revolve six and four tenths (6.4) times to four and one hundred twenty-nine thousandths (4.129) revolutions of the main roller 8, as their smaller diameters in 6.4 revolutions travel the entire circumference of the disk 12, on the outer face of its groove, in a contrary movement but in the same direction as the axle 2, revolves.

The operation of the supporting devices is as follows: The disk 12ª, carries with it in its revolution, the ring 24, which together with the disk impart motion to the balls or rollers in their grooved orbits of translation, the balls or rollers rolling freely upon the spreader spools 17, which isolate them from ach other and impart contrary motion to hose balls or rollers that roll in their grooved orbits on opposite sides of the casing ring 16, thus making a perfect rolling contact and holding the disks 12—12ª away from contact with the casing 15.

While I have described the structures shown in Figs. 1 and 2, as adapted for an axle, it is apparent that the same bearing, without change may be used for shaft purposes in which case, however, the rubber packing should be removed, the opening in the disk 12ª Fig. 1, should be enlarged to admit the passage of the shaft, the casing should be pierced for the shaft to project without touching the casing, and a collar placed on a shaft on the outer end of the disk 12ª, Fig. 1, and at the inner end of the disk 12ª Fig. 1.

If the bearing should be for a shaft instead of an axle, then all that would be necessary would be to pierce the outer casing as above described and in this case the dust-proof device would be applied to the outer end of the casing as well as the inner end thereof.

Having described my invention, what I claim and desire to secure by Letters Patent is:

1. An anti-friction journal bearing comprising in combination a casing and journal structure composed of a journal and opposing disks secured to and rotating with the journal and provided with bearing surfaces opposing each other, anti-friction bearing rollers having large and small diameters, the larger of which bear against the casing, and the smaller diameter against the inner bearing surface of the disks, a series of spreader rollers having two different diameters, the larger diameters between and contacting with adjacent bearing rollers, the smaller diameters contacting with the outer bearing surfaces of said disks, whereby said rollers and disks are respectively revolved about the axes of their bearing, in rolling contact with the casing and said bearing, substantially as described.

2. An anti-friction journal bearing comprising in combination a casing, a journal structure comprising a journal and opposing disks mounted thereon and rotating therewith, having opposing inwardly extending annular bearing surfaces, a series of bearing rollers having large and small diameters respectively bearing against the casing and the inner opposing bearing surfaces of the disks, a series of spreader rollers each having a large diameter between and contacting with adjacent bearing rollers, and provided with a small diameter the surface of which contacts with the outer bearing surfaces in the opposing rings, substantially as described.

In witness whereof, I have hereunto set my hand, this 23rd day of March 1906.

HUBBARD PARKER.

In the presence of witnesses:
ROBERT T. ERVIN,
VINCENT McALEER.

Copies of this patent may be obtained for five cents each, by addressing the "Commissioner of Patents, Washington, D. C."